(12) United States Patent
Levin et al.

(10) Patent No.: US 6,758,443 B1
(45) Date of Patent: Jul. 6, 2004

(54) METHOD FOR OBSERVING AND STABILIZING ELECTRODYNAMIC TETHERS

(75) Inventors: Eugene M. Levin, Minnetonka, MN (US); Joseph A. Carroll, Chula Vista, CA (US)

(73) Assignee: Tether Applications, Inc., Chula Vista, CA (US)

( * ) Notice: Subject to any disclaimer, the term of this patent is extended or adjusted under 35 U.S.C. 154(b) by 0 days.

(21) Appl. No.: 10/094,312

(22) Filed: Mar. 7, 2002

Related U.S. Application Data

(60) Provisional application No. 60/274,073, filed on Mar. 7, 2001.

(51) Int. Cl.⁷ .................................................. B64G 1/00
(52) U.S. Cl. .................................................. 244/158 R
(58) Field of Search .......................... 244/1 TD, 158 R, 244/164, 172

(56) References Cited

U.S. PATENT DOCUMENTS

| | | | |
|---|---|---|---|
| 3,362,656 A | * | 1/1968 | Wyatt |
| 3,532,298 A | * | 10/1970 | Swet |
| 3,582,016 A | | 6/1971 | Sherman |
| 3,868,072 A | | 2/1975 | Fogarty |
| 4,097,010 A | * | 6/1978 | Colombo et al. |
| 4,580,747 A | * | 4/1986 | Pearson |
| 4,686,605 A | * | 8/1987 | Eastlund |
| 4,824,051 A | | 4/1989 | Engelking |
| 4,923,151 A | | 5/1990 | Roberts et al. |
| 6,089,511 A | * | 7/2000 | Rasmusson |
| 6,116,544 A | | 9/2000 | Forward et al. |
| 6,173,922 B1 | | 1/2001 | Hoyt et al. |
| 6,260,807 B1 | | 7/2001 | Hoyt et al. |

OTHER PUBLICATIONS

Hoyt, R. and Uphoff, C. "Cislunar Tether Transport System." AIAA 99–2690. Jun. 1999.*
Hoyt, R. and Forward, R. "Performance of the Terminator Tether for Autonomous Deorbit of LEO Spacecraft." AIAA 99–2839. Jun. 1999.*
Hoyt, R. "Design and Simulation of a Tether Boost Facility For LEO—>GTO Transport." AIAA 2000–3866. Jul. 2000.*
Beletsky, Vladimir V. and Levin, Evgenii M., "Dynamics of Space Tether Systems," An American Astronautical Society Publication, Advances in the Astronautical Sciences, vol. 83, pps. 303–308 (1993).
Biglari, Haik and Galaboff, Zachary J., "An Extended Kalman Filter for Observing the Skiprope Phenomenon of the Tethered Satellite System," Proceeding of the Fourth International Conference on Tethers in Space, pps. 1475–1481 (Apr. 10–14, 1995).

(List continued on next page.)

*Primary Examiner*—Tien Dinh
(74) *Attorney, Agent, or Firm*—Dicke, Billig & Czaja, PLLC

(57) ABSTRACT

A tether system for space applications includes at least one electron collector, at least one electron emitter, a power system, and at least one electrodynamic tether electrically coupled to the power system. The electrodynamic tether conducts electrical current between at least one electron collector and at least one electron emitter. Electric current and voltage are measured. Selected tether dynamics and electrodynamics based on the measured electric current and voltage are ascertained. The electric current and/or current distribution is adjusted to thereby control at least one tether system state based on the ascertained selected tether dynamics and electrodynamics.

12 Claims, 3 Drawing Sheets

OTHER PUBLICATIONS

Carroll, Joseph A. and Oldson, John C., "SEDS Characteristics and Capabilities," Proceedings of the Fourth International Conference on Tethers in Space, vol. II, pps. 1079–1090 (Apr. 10–14, 1995).

Colombo, Giuseppe, Dr., "Investigation of Electrodynamic Stabilization and Control of Long Orbiting Tethers," Smithsonian Institution Astrophysical Observatory, Interim Report for the period Sep. 1, 1979 through Feb. 28, 1981, pps. 11–14 (Mar. 1981).

Corsi, J. and Iess, L, "Stability and Control of Electrodynamic Tethers for De–Orbiting Applications," $51^{st}$ International Astronautical Congress, IAF–00–S.6.06, pps. 1–11 (Oct. 2–6, 2000).

Eagle–Picher Technologies, LLC, "Nickel Hydrogen System," Technical Data Sheet for Nominal 60–Ampere–hour Eagle Picher Single Pressure Vessel Battery, pps. 1 (Aug. 4, 1999). See also <www.spi.tech.com>.

Guha, S. et al., "Low Cost and Lightweight Amorphous Silicon Alloy Solar Array for Space Application," $34^{th}$ Intersociety Energy Conversion Engineering Conference, SAE Technical Paper Series, 1999–01–2553, pps. 1–4 (Aug. 2–5, 1999).

Gullahorn, Gordon E. et al., "Long Period Tension Variations in TSS–1 and SEDS–2," Proceedings of the Fourth International Conference on Tethers in Space, pps. 389–398 (Apr. 10–14, 1995).

Hoyt, R. P. et al., "Progress on Development of the Terminator Tether," NASA JPL/MSFC/UAH $12^{th}$ Annual Advanced Space Propulsion Workshop, pps. 2 (Apr. 3–5, 2001).

Hoyt, R. and Forward, R., "The Termination Tether: Autonomous Deorbit of LEO Spacecraft for Space Debris Mitigation," $38^{th}$ Aerospace Sciences Meeting and Exhibit, AIAA 00–0329, pps. 1–12 (Jan. 10–13, 2000).

Marrese, Colleen, "Improved Field–Emission Cathodes," NASA Tech Brief, vol. 25, No. 9, pps. i–7a (Sep. 1, 2001).

Netzer, Ehud and Kane, Thomas R., "Estimation and Control of Tethered Satellite Systems," pps. 1–33 (1993–1994).

Netzer, Ehud and Kane, Thomas R., Uses of ElectroDynamic Forces in Tethered Satellite systems; Part I: System Control, pps. 1–27 (1993–1994).

Pearson, J., et al., "The ElectroDynamic Delivery Experiment (EDDE)," Space Technology and Applications International Forum, pps. 9 (Feb. 11–14, 2001).

Pelaez J. et al., "A New Kind of Dynamic Instability in Electrodynamic Tethers," JAS vol. 48, No. 4, pps. 1–23 (Nov. 24, 2000). (Presented at the $10^{th}$ AAS/AIAA Space Flight Mechanics Meeting on Jan. 23–26, 2000).

Penzo, P.A. and Ammann, P.W., Tethers in Space Handbook, Second Edition, NASA Office of Space Flight, pps. 7 (1986).

Spectrolab Inc., "Spectrolab Photovoltaic Products Specification Sheet for Space Solar Panels," pps. 2, (May 8, 2002). See also <www.spectrolab.com>.

Spectrolab Inc., "Spectrodata Product Specification Sheet for 26.8% Improved Triple Junction (ITJ) Solar Cells," pps. 2 (Jun. 29, 2001). See also <www.spectrolab.com>.

Spectrolab Inc., "Spectrodata Product Specification Sheet for $GaInP_2$/GaAs/Ge Dual Junction Solar Cells," pps. 2 (Jun. 29, 2001). See also <www.spectrolab.com>.

* cited by examiner

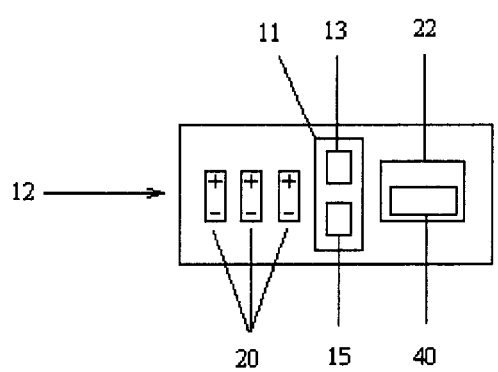
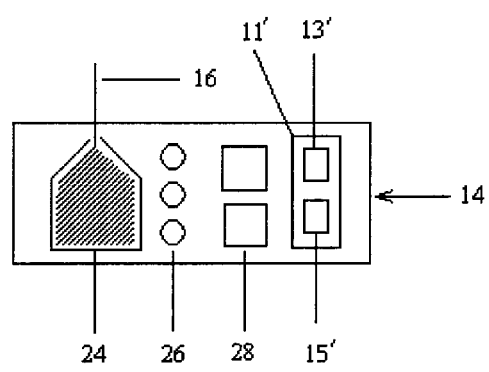
FIG. 2A
FIG. 2B

METHOD FOR OBSERVING AND STABILIZING ELECTRODYNAMIC TETHERS

CROSS-REFERENCE TO RELATED APPLICATIONS

This application claims the benefit of the filing of U.S. Provisional Patent Application Serial No. 60/274,073, entitled "METHOD AND APPARATUS FOR OBSERVING AND STABILIZING ELECTRODYNAMIC TETHERS," filed on Mar. 7, 2001, and which is herein incorporated by reference.

THE FIELD OF THE INVENTION

The present invention generally relates to satellite orbital propulsion and satellite power generation systems, and more particularly to a method and apparatus of employing a conducting tether to control satellite system state, such as to produce an electrodynamic propulsion force to change the orbit of a satellite through interaction between an electric current in the tether and an external magnetic field, or to generate electric power onboard the satellite.

BACKGROUND OF THE INVENTION

Space tethers have attracted a lot of attention in the past 40 years. Many researchers have contributed to the theory of tether behavior in orbit. The theory has been applied and proved in a number of space flights involving tethers attached to spacecraft.

In 1966, Gemini 11 and 12 manned spacecraft were attached with a tether to a rocket stage and demonstrated libration and rotation modes of tethered motion.

In 1992, TSS-1, the Shuttle-based Tethered Satellite System, including a 550-kg satellite and a 20-km electrically conductive tether, was partially deployed from the Shuttle orbiting at an altitude of 296 km. The measurement of the voltage-current profiles shed new light on electric behavior of conducting tethers in orbit.

In 1993, SEDS-I, the Small Expendable Deployment System, including a 26-kg mini-satellite on a 20-km non-conductive tether, was successfully deployed downward from a Delta rocket second stage. SEDS-I was a flight experiment to test the deployment of a long tether by means of a light and simple deployment mechanism and the deorbit and reentry of the mini-satellite after the release of the tether from the Delta stage. The 20-km non-conductive tether was the longest structure ever deployed in orbit.

Also in 1993, PMG, the Plasma Motor Generator, including a 500-m-long electrodynamic tether, was deployed from the Delta second stage with the primary goal of testing power generation and thrust by means of an electrodynamic tether. This mission was the first example of a propulsion system for space transportation that did not utilize any propellant, but rather achieved propulsion by converting orbital energy into electrical energy (deorbit) and electrical energy into orbital energy (orbit boosting).

In 1994, SEDS-II, the Small Expendable Deployment System (second flight), with the same equipment as SEDS-I, was utilized for a longer and more ambitious mission. SEDS-II was stabilized along the local vertical at the end of deployment and kept attached to the Delta stage to study acceleration environment. During the extended mission phase, the deployed SEDS-II was used to study the survivability of a thin tether to micrometeoroid impacts. During the extended mission phase, SEDS-II also provided important data on the micrometeoroid risk as the tether was cut at the 7-km point three days after the completion of the one-day primary mission.

In 1996, TSS-1R, a reflight of TSS-1 was attempted. The mission was terminated before due time by an electrical arc that severed the tether just before the end of deployment. Nevertheless, it was an important mission for tethered satellites, because it showed that the electrodynamic tethers were more efficient at collecting electrons than most theories and models predicted, providing valuable data on electric performance of electrodynamic tether systems.

In 1996, TiPS, the Tether Physics and Survivability Experiment, including a 4-km-long passive tethered system for the investigation of the long-term survivability of tethers in the space environment, was successfully started. This system proved that a sufficiently fat tether can survive for a very long time the harsh space environment, and also provided valuable data on the long-term passive internal damping of tether librations.

In 1999, the Advanced Tether Experiment (ATEx) began deployment in orbit. About 18 minutes into deployment, at a deployed length of only 22 meters, the tether went slack, bent, and triggered several tether departure angle optical sensors. This led to the tether experiment being automatically ejected, to protect the host vehicle. The slackness occurred just after sunrise and may have resulted from a thermal transient on the thin polyethylene tape tether.

In 2002, ProSEDS, the Propulsive Small Expendable Deployer System, is scheduled to deploy 10 km of Dyneema tether followed by 5 km of uninsulated wire from a Delta-II stage to test the electrodynamic propulsion capabilities of the tether.

"Tethers in Space Handbook," First Edition, NASA Office of Space Flight, NASA Headquarters, Washington, D.C., 1986, edited by P. A. Penzo and P. W. Ammann, provides summaries of various applications and features of space tethers, including methods to change orbital elements with electrodynamic tether propulsion and methods to control the attitude dynamics of such tethers. The basic concept is to vary the electric current in the tether based on the estimate of the tether state obtained from measurements of certain tether system parameters.

The following patents cover certain details of electrodynamic tether usage.

U.S. Pat. No. 6,116,544, entitled "Electrodynamic Tether and Method of Use," issued Sep. 12, 2000, to Forward et al., describes electrodynamic tethers for deorbiting out-of-service satellites.

U.S. Pat. No. 6,260,807, entitled "Failure Resistant Multiline Tether," issued Jul. 17, 2001, to Hoyt et al., discusses various multistrand tethers to improve strength and stability.

U.S. Pat. No. 4,923,151, entitled "Tether Power Generator for Earth Orbiting Satellites," issued Mar. 1, 1988 to Roberts et al., discloses use of an electrodynamic tether as a power generator for earth orbiting satellites.

U.S. Pat. No. 4,824,051, entitled "Orbital System Including a Tethered Satellite," issued Jan. 12, 1987 to Engelking, discloses use of an electrodynamic tether attached to a satellite to compensate for the air drag and the orbit degradation.

U.S. Pat. No. 3,868,072, entitled "Orbital Engine," issued Feb. 25, 1975, to Fogarty, discloses a tether to rotate/revolve one mass about the other and provide energy.

U.S. Pat. No. 3,582,016, entitled "Satellite Attitude Control Mechanism and Method," issued Jun. 1, 1971, to Sherman, discloses a study about transverse waves and rotational dynamics. The '016 Patent does not disclose electrodynamics or use of magnetic fields.

Most of the early estimates of performance of electrodynamic tethers were based on static stability considerations, where non-stationary processes were ignored. In recent years, however, more attention has been given to dynamic stability considerations, where complex non-stationary dynamic response to real perturbations is taken into account.

V. V. Beletsky and E. M. Levin in "Dynamics of Space Tether Systems," Advances in the Astronautical Sciences, v. 83, AAS, 1993, described many modes of inherent instabilities of electrodynamic tethers that are observed even in equatorial circular orbits, and even when dynamic models neglect magnetic field variations along the orbit. The Beletsky and Levin reference points out that it would be virtually impossible to operate electrodynamic tether systems anywhere close to the boundaries of static stability, because of a very strong, uncontrollable or hardly controllable dynamic instability in these regions. It has been shown in this study that realistic expectations for safe electric current levels must be typically lowered by an order of magnitude compared to static levels because of dynamic instabilities.

More evidence of rigid dynamic instability constraints was accumulated, as more detailed and realistic simulations were performed.

J. Pelaez, E. C. Lorenzini, O. Lopez-Rebollal, and M. Ruiz in "A new kind of dynamic instability in electrodynamic tethers," AAS 00-190, AAS/AIAA Space Flight Meeting Jan. 23–26, 2000, pointed out that instability is inherent in any uncontrolled electrodynamic tether motion and simply cannot be avoided.

R. P. Hoyt and R. L. Forward in "The Terminator Tether: Autonomous Deorbit of LEO Spacecraft for Space Debris Mitigation," AIAA 00-0329, 38th Aerospace Sciences Meeting & Exhibit, Jan. 10–13 2000, Reno, Nevada, reported that active control had to be applied to cope with dynamic instabilities. The results of their detailed dynamics simulation results showed actual performance levels much more conservative than described in the Forward et al. U.S. Pat. No. 6,116,544 based on static stability considerations. This was attributed to the dynamic stability constraints.

J. Corsi and L. less in "Stability and Control of Electrodynamic Tethers for De-orbiting Applications," IAF-00-S.6.06, 51st International Astronautical Congress, Oct. 2–6 2000, Rio de Janeiro, Brazil, showed that realistically for deorbiting with an electrodynamic tether, the electric current in the tether must be periodically switched off to prevent libration buildup and rotation onset, thus substantially decreasing deorbiting efficiency of the electrodynamic tether.

R. P. Hoyt, G. Heinen, and R. L. Forward in their presentation on the "Progress on Development of the Terminator Tether," NASA JPL/MSFC/UAH 12th Annual Advanced Space Propulsion Workshop, University of Alabama in Huntsville, Huntsville, Ala., Apr. 3–5, 2001, took this idea further, indicating that it may be sufficient to reduce the current by 10% when the tether swings in-plane backwards to prevent instability. No control of out-of-plane and skiprope modes was attempted.

It is important to prevent not only any strong instability, but also weak instabilities that will impact long-term electrodynamic tether missions. In other words, electrodynamic tethers in most missions must be stabilized on a long-term basis.

One of the most commonly suggested control strategies is to vary Ampere forces distributed along the tether by varying the electric current in the tether. G. Colombo, M. Grossi, M. Dobrowolny, and D. Arnold in "Investigation of Electrodynamic Stabilization & Control of Long Orbiting Tethers," March 1981, SAO, Contract NAS8-33691, discussed some strategies of how to use electric current modulation to stabilize an electrodynamic tether in a near-vertical position.

E. Netzer and T. R. Kane in "Uses of ElectroDynamic Forces in Tethered Satellite Systems," 1994, showed how to augment the electric current control with thruster pulses to keep the electrodynamic tether close to the local vertical during orbit transfers.

In order to control tether dynamics, the tether libration and oscillation state must be properly estimated throughout the mission.

A combination of satellite attitude angles, attitude rates, and gyro data, along with Earth sensor and magnetometer measurements was used to estimate the tether state in the TSS flights, as reported by H. Biglari and Z. J. Galaboff in "An Extended Kalman Filter for Observing the Skiprope Phenomenon of the Tethered Satellite System," 4th International Conference on Tethers In Space, Washington, D.C., Apr., 10–1995.

E. Netzer and T. R. Kane in "Estimation and Control of Tethered Satellite Systems," 1994, suggested measuring angles between the local vertical and the tether at the attachment points to estimate the tether state, including rotation and bending.

In 1995, Gullahorn et al, in "Long Period Tension Variations in TSS-1 and SEDS-2," in the proceedings of the Fourth International Conference on Tethers in Space, point out that "observations of tension in a tethered system could provide a measure of librational amplitude and phase." The analysis of flight data they present shows that in-plane libration is typically far easier to detect than out-ofplane libration using this technique. This is expected because in-plane libration induces large Coriolis effects while out-of-plane libration does not. On SEDS-2, a consistent pattern of a +/−8% tension variation with a 53 minute period suggests a 4 degree amplitude in-plane libration after the end of deployment.

While these estimation and control approaches for tethered satellite systems were suited to work in their respective particular cases, there is a need for more general and more practical estimation and control approaches that will work not only in the vicinity of the local vertical, but also over a wider range of dynamic conditions encountered by electrodynamic tethers. In addition, there is a need for estimation and control approaches for tethered satellite systems that employ more simple and readily available measurements to estimate the tether state.

SUMMARY OF THE INVENTION

One aspect of the present invention provides a method of controlling a tether system for space applications. The method including collecting electrons at least one location in the tether system, emitting electrons at at least one location in the tether system, and providing power to an electrodynamic tether. Electric current is conducted with the electrodynamic tether between at least one electron collecting location and at least one electron emitting location. Electric current and voltage are measured. Selected tether dynamics and electrodynamics based on the measured electric current and voltage are ascertained. The electric current and/or current distribution is adjusted to thereby control at least one tether system state based on the ascertained selected tether dynamics and electrodynamics.

One aspect of the present invention provides a method for stabilizing an electrodynamic tether system having an electrodynamic tether. The method includes adding variations of an electric current in the tether to a mission-specific current profile. The added variations of the electric current have the same sign as the EMF induced by undesired velocity components of the electrodynamic tether with respect to a desired tether state.

One aspect of the present invention provides a method for estimating a dynamic state of an electrodynamic tether system having a electrodynamic tether. The method includes measuring the voltage and electric current in the electrodynamic tether. The method includes computing selected model tether dynamics and electrodynamics of a computer model of the tether system. The method includes estimating the dynamic state by finding an optimized fit of a relationship between the measured voltage and electric current and the computed selected model tether dynamics and electrodynamics.

BRIEF DESCRIPTION OF THE DRAWINGS

FIG. 2A is a diagram illustrating one embodiment of internal components of a high-power end-body of an electrodynamic tether system.

FIG. 2B is a diagram illustrating one embodiment of internal components of a low-power end-body of an electrodynamic tether system.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One aspect of the present invention relates to the control of motion of electrodynamic tethers. Electrodynamic tethers are also referred to as conducting tethers. Electric current can flow through an electrodynamic tether (or some segments of the tether) closing the circuit through ambient plasma in a magnetic field. The conductivity provides for energy transfer (e.g., of electrical power into mechanical energy of motion) and data transmission (e.g., sensor data or command signals). For energy transfer applications, the electrodynamic tether acts as a motor or generator and exerts forces upon the vehicle or object to which it is attached.

In one embodiment, orbital maneuvering and power generation capabilities of a satellite or satellites connected with a conducting and partially or fully insulated tether or tethers can be better utilized under a stabilizing control which adds a relatively small variation of the electric current in the tether to the mission-specific current profile, depending on the electrical and dynamical state of the tether system. The control strategy is formulated in such a way that the energy of relative tether motion is dissipated over a wide range of dynamic conditions. The long-term impact of the stabilizing control on the mission schedule remains small as long as the electric current variation can be kept small compared to the average electric current. In one embodiment, the tether states, including both rotation and bending, are estimated by measuring only electric current and voltage. In other embodiments, tether states are estimated by also measuring tether tension and/or endmass acceleration.

System Components

Figure 1:
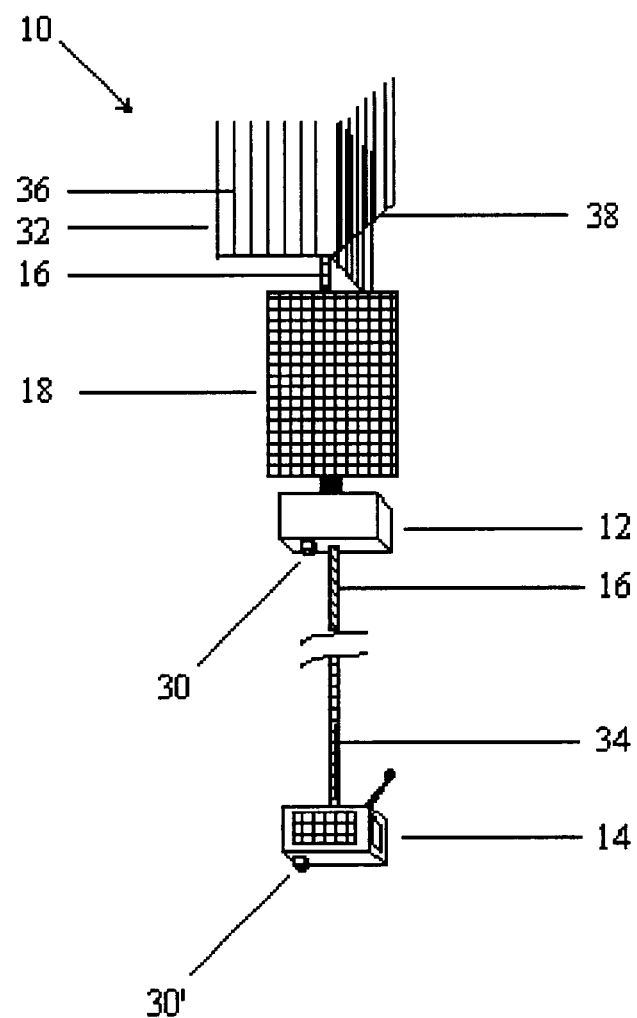
FIG. 1 is a diagram illustrating one embodiment of an electrodynamic tether system.

FIG. 1 illustrates one embodiment of an electrodynamic tether system 10. Electrodynamic tether system 10 comprises a high-power end-body 12 and a low-power end-body 14 connected by an electrodynamic tether 16. In one embodiment, electrodynamic tether 16 is a meteoroid-resistant, electrically bi-directional tether 16. FIG. 2A illustrates internal components of high-power end-body 12. FIG. 2B illustrates internal components of low-power end-body 14.

High-power end-body 12 is coupled to a solar array 18. High-power end-body houses batteries 20 and power supply 22. Low-power end-body 14 houses deployer 24, diagnostic instrumentation 26, and payloads 28. In one embodiment, diagnostic instrumentation 26 includes an electric current sensor, a voltage sensor, a tensiometer, an accelerometer, plasma diagnostic sensors, and/or any other desired measurement devices or sensors, all of which can be embodied in well known measurement devices/sensors. Each end-body 12/14 includes avionics and telemetry for communications 11/11', including a GPS receiver 13/13' for navigation and a computer 15/15' for command and control. End-body 12 includes electron emitter 30 and is coupled to electron collector 32. End-body 14 includes electronemitter 30' and is coupled to electron collector 34.

One embodiment of electrodynamic tether system 10 includes thin-film solar arrays 18 and lightweight batteries 20. A sample mass budget by subsystem and some details of suitable components are described in J. Pearson, E. Levin, J. Oldson, and J. Carroll "The ElectroDynamic Delivery Experiment (EDDE)," Space Technology and Applications International Forum, Albuquerque, N.M., Feb. 11–14, 2001, which is herein incorporated by reference.

In various embodiments, electrodynamic tether 16 includes a multi-stranded conductor, a flattened conductor, a hollow cylinder conductor, or a thin tape conductor in order to reduce the risk of failure from micrometeoroids to an acceptably low level. Nevertheless, one embodiment of electrodynamic tether 16 includes a single strand conductor, which can be used in limited applications. A detailed discussion of suitable types of electrodynamic tethers is provided in U.S. Pat. No. 6,173,922, to Hoyt et al., entitled "Failure Resistant Multiline Tether," issued Jan. 16, 2001, and which is herein incorporated by reference.

In the embodiment illustrated in FIG. 1, electrodynamic tether 16 is implemented as a multi-strand caduceus tether. For minimum tether mass, one embodiment of electrodynamic tether 16 includes an aluminum conductor, which has about twice the conductivity per unit mass as a copper conductor. Other embodiments of electrodynamic tether 16 include conductors made of other suitable conductive materials.

It is often beneficial to insulate much of the electrodynamic tether 16 length from the surrounding plasma. The tether insulation can the add appreciably to the tether mass. The tether insulation, however, can raise the tether's thermal emittance and thereby reduce the tether's operating temperature, which thereby reduces electrical resistance of the tether.

Electrodynamic tether 16 may operate unidirectionally or bi-directionally. For bi-directional operation, electron collection and electron emission are switched from one end to the other, such as by duplicating electron emitters 30/30' and electron collectors 32/34 on each end of electrodynamic tether 16. In one embodiment, hollow cathode emitters 30/30' provide improved ionospheric plasma contact. In one example embodiment, the hollow cathode emitters 30/30' are approximately shoebox size, and include a gas supply and plumbing. For missions up to at least six months, a 10 kg weight for a pair of hollow cathode emitters is suitable. Existing designs of suitable hollow cathode emitters 30/30' are available from the ProSEDS program and the space station application.

The electrodynamic tether 16 tether can be any suitable length, such as from 1 to 10 km. In practice, electrodynamic tether 16 should be long enough to keep electron collection and emission voltages from becoming dominant, but not so long that the implications of high-voltage issues become dominant.

Although FIG. 1 illustrates a hollow cathode electron emitters 30/30' other suitable electron emitters may be employed in electrodynamic tether system 10. Example implementations of other suitable electron emitters 30/30' include thermionic wire segments, field emitter array cathodes (FEACs), and photocathodes.

Thermionic wire segments have multiple (e.g., ten) separately switched and monitored wire segments and can be embodied in many configurations. Each thermionic wire segment takes a certain amount of heating power (e.g., approximately 10 W for 0.2×100 mm ThO/W at 1750K). The number of thermionic wire segments in a given electron emitter 30/30' determines the amount of current that can be emitted at a given time from the electron emitter. Thus, a suitable electron emitter 30/30' includes sufficient thermionic wire segments to keep space charge losses low and limit sputtering of the wire segments by ionized oxygen, while not wasting energy heating more wire segments than necessary. One embodiment of electron emitter 30/30' includes a barium scandate or other oxidation-resistant low work function coating.

FEACs may require significantly less power than thermionic wire segments. FEACs are very tiny devices that individually have small emitting capability. Nevertheless, a two-dimensional array of FEACs can be fabricated at once on a small chip, using micro-electro-mechanical systems (MEMS) fabrication techniques similar to those used in making integrated circuits. MEMS arrays of FEACs arrays are generally approximately 1×1 mm and include millions of emitting tips. MEMS arrays may be suited for long-term use, if the emitting tips can be kept from being damaged by sputtering from ionized oxygen in the surrounding environment. One way to do this was proposed by Colleen Marrese of JPL, in the September 2001 NASA Tech Briefs. The purposal involves multiple gate electrodes to both enhance fields near the emitting tips while also deflecting ambient positive ions away from those tips.

Photocathodes only operate in the sun. Photocathodes can be integrated into the electron collector, allowing a longer current path at less power. One embodiment of photocathodes comprise negative-electron affinity semiconductors with a bandgap less than about 3.5 eV and resistance to low levels of neutral and ionized atomic oxygen.

In the embodiment illustrated in FIG. 1, electrodynamic tether system 10 includes electron collectors 32/34 at each end, and is capable of bi-directional operation. In an example electrodynamic tether system 10, collectors 32/34 are designed for about 60 $m^2$ per kilowatt of power.

Some embodiments of electron collectors 32/34 comprise multiple separated strands, because each strand is preferably relatively narrow (e.g., a few Debye lengths) to be most effective. In one embodiment, electron collectors 32/34 are implemented with open net-like electron collectors. The open net-like electron collectors have ligaments spaced at distances many times the width of each ligament. If the ligament separation distances are at least many times (e.g., 10×) their width, mutual interference in electron collection is generally low. One embodiment of electrodynamic tether system 10 includes two multiple-element collectors 32 and 34. Electron collector 32 coupled to high-power end-body 12 comprises ribs 38 (e.g., aluminum ribs) splayed radially outward from electrodynamic tether 16, with long members 36 hanging from ribs 38 similar to the tines of a lawn rake. This lawn rake-like or net-like electron collector 32 is very lightweight and efficient, and is ideally suited for non-retractable electrodynamic tether systems. In one embodiment, electron collector 32 is oriented to reduced drag.

In one embodiment, electron collector 34 forms the last length (e.g., 400 meters) of electrodynamic tether 16 coupled to low-power end-body 14. One embodiment of electron collector 34 is a two-element caduceus (e.g., with each element being 30 mm wide, for a total collecting area of 48 $m^2$). Electron collector 34 is suitably embodied in other types of electron collectors known in the art. In one embodiment, a portion (e.g., 8 $m^2$) of electron collector 34 is coated for emittance, to reduce operating temperature. This embodiment of electron collector 34 is preferably located on the tether side of low-power end-body 14, leaving the non-tether side of low-power end-body 14 of electrodynamic tether system 10 free for other purposes, such as to rendezvous with other satellites.

In one embodiment, electrodynamic tether system 10 comprises a high-voltage solar array 18, a DC-to-DC power converter 40 in power supply 22, and batteries 20 for energy storage and leveling. In one embodiment, the DC-to-DC power converter 40 contained in power supply 22 is a four-quadrant DC-to-DC power converter.

For a power output of a few kW, one suitable embodiment of solar array 18 comprises conventional gallium arsenide based, multi-junction arrays. Using the data from the Hughes Spectrolab website solar arrays of 2 kW have an efficiency of 22%, weigh about 1.9 kg/$m^2$, and have a power/area ratio of 300 W/$m^2$. For 2 kW power, this results in a suitable example solar array 18 having at least an area of 6.7 $m^2$ and a weight of 12.7 kg. Allowing about a 50% increment for deployment and panel construction yields a suitable example total weight of about 20 kg. The potential mass savings of these new thin-film solar arrays are impressive, and results in a weight reduction of several kilograms. A specific power of over 2400 W/kg for lightweight amorphous silicon solar arrays is reported in Guha, S. et al., "Low Cost and Lightweight Amorphous Silicon Alloy Solar Array for Space Application," $34^{th}$ Intersociety Energy Conversion Engineering Conf., Paper 1999-01-2553, (1999). If performance approaching these levels can be realized at a reasonable price, one embodiment of solar array 18 could be implemented with a larger solar array to thereby drive the electrodynamic tether 16 with significantly more power instead of reducing the solar array weight. Due to the high efficiency of electrodynamic tethers as thrusters, the added aerodynamic drag of the larger low-efficiency solar array is not a significant problem, even at orbit altitudes as low as ~350 km. Even allowing for extra power conductors and structure, a few kilograms mass is suitable with thin-film arrays. As can be appreciated by those skilled in the art, other suitable types of solar arrays and solar energy collection devices, as well as other suitable power sources, can be employed in electrodynamic tether system 10.

DC/DC power converter 40 in power supply 22 provides power to electrodynamic tether 16 for orbital changes, and the amount of power required for orbital changes varies with the orbital position. Accordingly, DC/DC power converter 40 provides a variable voltage and current (e.g., −500V to +1500V at currents up to 5–6 A) to move the power back and forth between electrodynamic tether 16 and low-voltage battery 20 as efficiently as possible.

The power system of electrodynamic tether system 10 is preferably properly sized to meet mission requirements, taking into account the power available from solar array 18 during sunlight, the power available from the batteries 20 during darkness, and the power losses resulting from the electrical resistance (i.e., ohmic losses) of electrodynamic tether 16, and from the less than perfect efficiency of the electron capture at electron collectors 32/34 and electron emission at electron emitters 30/30' (i.e., contactor losses).

The power system of electrodynamic system 10 varies the electrodynamic tether 16 electric current for tether dynamics control.

In various embodiments, batteries 20 are a major component of the baseline power system, which is designed to operate in a bidirectional mode, where energy extracted by electrodynamic tether 16 is stored for later use. Batteries 20 allow operation in the motor mode during eclipses. Batteries 20 preferably allow fast charge/discharge during a large number of cycles. One suitable embodiment of batteries 20 for low earth orbit (LEO) missions are nickel-hydrogen batteries. Suitable example batteries 20 are the nominal 60-Ampere-hour Eagle-Picher Single Pressure Vessel battery, which has about a 60 W-hr/kg specific energy at full discharge, or about 18 W-hr/kg at an assumed 30% depth of discharge. In an example electrodynamic tether system 10, an example 30 kg battery provides storage of about 1.7 kW-hr, allowing the desired load leveling and regenerative storage of power.

Other suitable battery types and other energy storage methods are optionally suitable for the power system of electrodynamic tether system 10, but system considerations are preferably taken into account when assembling a suitable power system. For example, lithium ion batteries 20 have higher power/mass ratios, but need to meet the cycle requirements for LEO applications. Flywheel energy storage can meet the high number of fast cycles required by LEO applications, but flywheel energy storage technology is not nearly as mature as battery technology.

Deployer 24 is preferably designed to meet the needs of the particular space missions of interest. A SEDS-type one-shot deployer compatible with the electrodynamic tether 16 and electron collector 34 is suitable for deployment on certain missions. Such a suitable deployer is described in J. A. Carroll and J. C Oldson, in "SEDS Characteristics and Capabilities," 4th International Tether Conference, Washington, D.C., 1995, which is herein incorporated by reference.

Another suitable deployer 24 is the PMG (Plasma Motor Generator) deployer, which was explicitly designed for deploying wire in space.

A caduceus electrodynamic tether 16 works well with a reel deployer 24. Another alternative deployment mechanism is to pull the electrodynamic tether 16 out of a jellyroll packaging that uses a weak adhesive, vacuum grease, or other means to bond the wound package together. The resulting weak bonding between turns can prevent even a somewhat springy metal tether from prematurely deploying in place like a clockspring, if the already deployed length of tether goes momentarily slack.

Damping Strategy

The instability of electrodynamic tethers develops when energy is regularly pumped into the relative tether motion through the interaction between the tether and magnetic field. The excessive energy must be constantly drained out of the electrodynamic tether system 10 in order to maintain continuous operation.

To understand the strategy of damping undesired motions of electrodynamic tethers, consider an ideal (desired) motion of an such described electrodynamic tether system in which the tether moves like a rigid body. Example such desired motions include: a motion when the tether is aligned with the local vertical; a motion when the tether is straight and tilted to the local vertical at a constant angle; a motion when the tether is straight and rotating about the mass center; a motion when the tether is bowed and holds shape like a rigid body; some periodical motion with a straight or statically bowed tether, or some other type of motion with a fixed tether shape. Such motions are very rarely found as exact solutions of the equations of motion, but rather represent a concept of an ideal motion of an electrodynamic tether suited for certain propulsion or power generation operations.

A frame of reference is introduced which moves with this ideal rigid tether, and follows the desired motion. Tether motion with respect to the frame of reference associated with the desired tether state represents deviations from the ideal motion. Certain deviations from the ideal motion may be considered undesired, especially, when they grow in magnitude.

As taught herein, these undesired motions can be damped with the electric current variation given by the following Equation I.

$$I = I_c + dI, \qquad \text{Equation I}$$

where $I_c$ is a command current defined by the mission profile, and $dI$ is a stabilizing current variation, depending on the instant electrical and dynamical state of the tether, such that $dI < 0$ when $E_r < 0$, and $dI < 0$ when $E_r < 0$, where $E_r$ is the EMF induced by undesired velocity components of the tether with respect to the desired, ideal tether state.

The stabilizing current variation $dI$ can be obtained by adjusting the electric current in electrodynamic tether 16 and/or the electric current distribution in the electrodynamic tether.

The EMF induced by relative motion and therefore the control current variation $dI$ depend on the magnetic field induction and velocities and positions of relative motion along the tether.

To illustrate the damping effect, general relations of energy conversion for electrodynamic tethers are used to determine that the rate of change of the mechanical energy of relative motion due to the current variation $dI$ is equal to $(-E_r \cdot dI) < 0$ and is negative in any relative motion. Thus, the electric current variation will tend to damp all kinds of undesired motion independent of the particular nature of the undesired motion.

The cumulative nature of damping makes this strategy very tolerant of periods when problems with the power system, data acquisition system, and/or, control system make the stabilizing control temporarily unavailable. Control systems utilizing this strategy are therefore inherently robust.

One-sided controls might often be used, which just decrease current from the ideal values when that is beneficial for control. This allows the system to be operated at higher average currents, since no margin is needed for positive control current adjustments.

The general damping method of one embodiment of the present invention can be applied in a wide variety of situations, and a number of particular damping strategies can be derived from this general approach.

For example, applying this general damping method to an ideal motion with a vertical tether, and assuming $dI=k \cdot E_r$, the following control for damping small undesired librations near the local vertical is expressed by Equation II.

$$dI_0 = k_0 \cdot (B_z d\theta/dt - B_y d\phi/dt), \qquad \text{Equation II}$$

where $\theta$ is the in-plane libration angle, $\phi$ is the out-of-plane libration angle, $\theta$ and $\phi$ are assumed small, d/dt denotes time derivative, and $B_y$ and $B_z$ are the tangent-to-orbit and out-of-plane components of the magnetic induction.

As another example, control for damping the nth mode of small transverse oscillations of the tether is expressed by Equation III.

$$dI_n = k_n \cdot (B_z d\eta_n/dt - B_y d\zeta_n/dt), \qquad \text{Equation III}$$

where $\eta_n$ and $\zeta_n$ are in-plane and out-of-plane components of the n-th mode of oscillations.

Note that it is not apparent how the magnetic induction components, variable along the orbit, enter the above control Equations II and III.

Furthermore, the above-mentioned libration and oscillation damping strategies can be combined as $dI = dI_0 + dI_1 + \ldots$ and weighted by adjusting coefficients $k_0, k_1, \ldots$ to provide simultaneous damping of several modes for particular missions.

These examples teach how to apply the general damping method of one embodiment of the present invention to formulate damping strategies for electrodynamic tethers in particular cases.

Particular implementations of the general damping method of one embodiment of the present invention have been successfully applied in numerical simulations for various electrodynamic tether systems and various mission scenarios, greatly improving stability and performance characteristics of electrodynamic tethers.

Tether State Estimation

In order to execute the damping strategy, the dynamic state of the electrodynamic tether 16 must be regularly estimated. It is quite difficult to directly measure positions and velocities of the tether points. However, there are two integral parameters of an electrodynamic tether that are readily available, the output voltage to the tether and electric current in the tether. The output voltage is expressed by the following Equation IV.

$$V = E + V_p, \qquad \text{Equation IV}$$

where E is the EMF induced in the tether, and $V_p$ is a sum of various losses, including the ohmic voltage drop in the tether, electron collection voltage, and possibly other components specific to each design. The parasitic losses depend on the current and electron density, which in turn depends on time and the orbital position of the electrodynamic tether system. A suitable estimate of the parasitic losses can be obtained from appropriate models as a function of the electric current, time, and orbital position. The EMF can also be measured more directly and accurately if the electric current is periodically switched off for very short periods of time.

The EMF depends on the tether motion with respect to the magnetic field. For example, when the tether bowing is rather small and the orbit is nearly circular, the EMF is expressed by the following Equation V.

$$E = v_c \cdot L_c \cdot (B_z \cos \theta \cos \phi - B_y \sin \phi), \qquad \text{Equation V}$$

where $\theta$ is the in-plane angle, $\phi$ is the out-of-plane angle, $B_y$ and $B_z$ are the tangent-to-orbit and out-of-plane components of the magnetic induction, $L_c$ is the effective length of the conducting segment of the tether, and $v_c$ is the velocity of the mass center with respect to the magnetic field.

Equation V shows that the EMF is sensitive to the tether rotation except for one case, when the tether librates very close to the local vertical and the in-plane angle $\theta$ is very small. In this case, we consider another integral quantity, the tension at one of the attachment points, which is expressed by Equation VI.

$$T = 3m^* \omega^2 L ((d\phi/dt)^2 + (d\theta/dt+1)^2 \cos^2\phi + 3\cos^2\theta \cos^2\phi - 1), \qquad \text{Equation VI}$$

where m* is the reduced mass of the electrodynamic tether system, L is the total tether length, and d/dt denotes time derivative. Unlike the EMF, the tension is sensitive to the in-plane rotation with small $\theta$, but lacks sensitivity to out-of-plane rotation with small $\phi$.

The following Equation VII expresses the effect of transverse tether oscillations on the EMF.

$$dE_n = \Phi_n \cdot ((B, v_c \times e_\eta)\eta_n + (B, v_c \times e_\zeta)\zeta_n), \qquad \text{Equation VII}$$

The following Equation VIII expresses the effect of small transverse tether oscillation on the tension.

$$dT_n = -2\omega^2 \gamma_n \cdot ((d\phi/dt) d\zeta_n/dt + (d\theta/dt+1) \cos \phi d\eta_n/dt), \qquad \text{Equation VIII}$$

where $\eta_n$ and $\zeta_n$ in Equations VII and VIII are in-plane and out-of-plane components of the nth mode of oscillations.

The present specification teaches that in the case when the tether stays close to the local vertical, the voltage and tension measurements complement each other in the sense that the voltage bears a substantially clear signature of the out-of-plane motion, including libration and oscillation modes, of the tether and the tension, as well as tension-induced acceleration, bears a substantially clear signature of the in-plane motion of the tether, including libration and oscillation modes. Taken together with the electric current measurements, the voltage and tension can be used to derive both libration and oscillation state of the tether. In other cases, the voltage and electric current measurements are sufficient for the tether state estimation.

In one embodiment, tether tension and/or local acceleration are/is measured at substantially a same location in electrodynamic tether system 10 as the electric current and voltage measurements.

Figure 3:
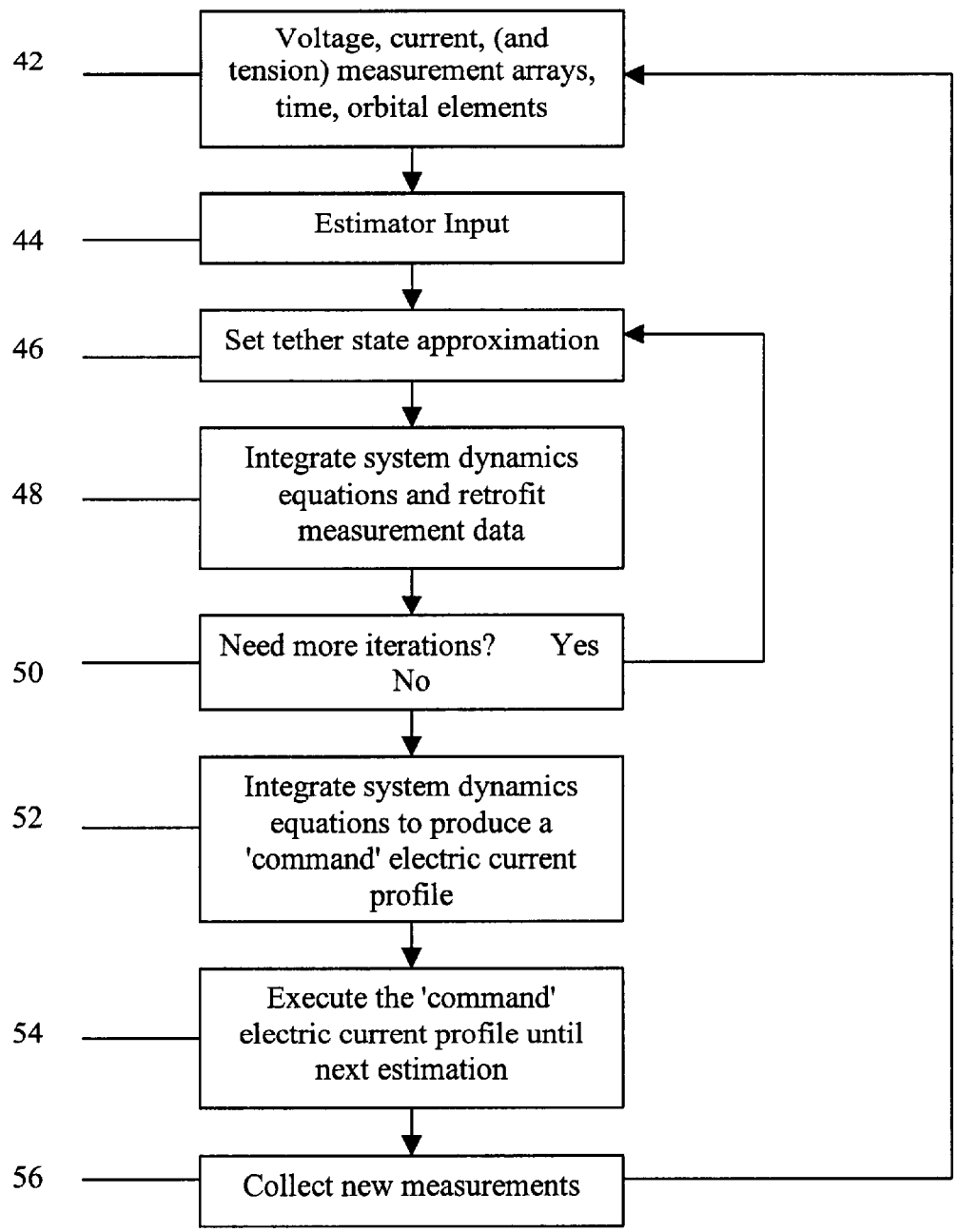
FIG. 3 is a flow diagram illustrating one embodiment of general estimation and control logic for an electrodynamic tether system.

FIG. 3 illustrates one embodiment of general estimation and control logic (i.e., an estimator) for electrodynamic tether system 10 in flow diagram form. In one embodiment, the estimator of electrodynamic system 10 is implemented in one or both of computers 15/15'. As indicated at 42 and 44, the arrays of electric current, voltage, and possibly tether tension measurements over the last orbit, along with the current time and orbit elements are submitted to the estimator.

As indicated at 46, 48, and 50, using its internal model of the specific electrodynamic tether system, including both dynamics and electrodynamics, the estimator integrates the equations of tether system motion, and finds an optimized (e.g., best fit) with the measurements by varying the current tether state, which serves as initial conditions for integration.

As indicated at 52, the estimator then integrates the equations of tether system motion forward in time to produce the electric current schedule, utilizing the above-presented damping control strategies. As indicated at 54, the new electric current schedule is executed until the next call to the estimator. As indicated at 54, during this time, new voltage, current, and tension measurements are collected. The voltage, current, and tension measurement arrays, indicated at 42 are refreshed and submitted to the estimator as indicated at 44, along with the time and latest orbit elements. The process repeats at intervals optimized for a particular mission. Very modest computing power is required to implement an estimator of this type.

In particular cases when the electric current and/or voltage are commanded by the control system, these command values may be treated to a certain extent as measurement data. However, in a general case, command values are not guaranteed to be close to the actual values.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method for stabilizing an electrodynamic tether system having an electrodynamic tether, the method comprising:

adding variations of an electric current in the tether to a mission-specific current profile, wherein the added variations of the electric current have the same sign as the EMF induced by undesired velocity components of the electrodynamic tether with respect to a desired tether state.

2. The method of claim 1 wherein the current variations are defined as functions of representations of the EMF induced in the tether by relative motion.

3. The method of claim 2 wherein the current variations are defined as functions of detailed representations of the EMF induced in the tether by relative motion.

4. The method of claim 2 wherein the current variations are defined as functions of simplified representations of the EMF induced in the tether by relative motion.

5. A method for estimating a dynamic state of an electrodynamic tether system having a electrodynamic tether, the method comprising:

measuring the voltage and electric current in the electrodynamic tether;

computing selected model tether dynamics and electrodynamics of a computer model of the tether system; and estimating the dynamic state by finding an optimized fit of a relationship between the measured voltage and electric current and the computed selected model tether dynamics and electrodynamics.

6. The method of claim 5 further comprising:

measuring tether tension; and estimating the dynamic state by finding the optimized fit of a relationship between the measured voltage, electric current, and tether tension and the computed selected model tether dynamics and electrodynamics.

7. The method of claim 6 wherein the measuring of the electric current and voltage and the measuring of tether tension are performed substantially at a same location in the tether system.

8. The method of claim 5 further comprising:

measuring local acceleration; and estimating the dynamic state by finding the optimized fit of a relationship between the measured voltage, electric current, and local acceleration and the computed selected model tether dynamics and electrodynamics.

9. The method of claim 8 wherein the measuring of the electric current and voltage and the measuring of local acceleration are performed substantially at a same location in the tether system.

10. The method of claim 5 further comprising:

periodically switching off and/or significantly reducing the electric current for a short period of time to obtain open-circuit voltage measurements which allow more accurate estimation of the EMF.

11. The method of claim 5 further comprising:

estimating the dynamic state by finding the optimized fit of a relationship between the measured voltage, electric current, and plasma parameters and the computed selected model tether dynamics and electrodynamics;

periodically switching off and/or significantly reducing the electric current for a short period of time so the voltage changes between high-current and low-current operation can be used to better estimate the plasma parameters used in the estimating of the dynamic state.

12. A method of controlling a tether system for space applications, the method comprising:

collecting electrons at at least one location in the tether system;

emitting electrons at at least one location in the tether system;

providing power to an electrodynamic tether;

conducting electric current with the electrodynamic tether between at least one electron collecting location and at least one electron emitting location;

measuring electric current and voltage;

ascertaining selected tether dynamics and electrodynamics based on the measured electric current and voltage; and adjusting at least one of the electric current and current distribution to thereby control at least one tether system state based on the ascertained selected tether dynamics and electrodynamics.

\* \* \* \* \*